Nov. 10, 1953
A. C. HALTER
2,659,040
ELECTRIC CONTROL SYSTEM FOR DYNAMOELECTRIC
MACHINES WITH REVERSIBLE CURRENT
Filed June 1, 1951
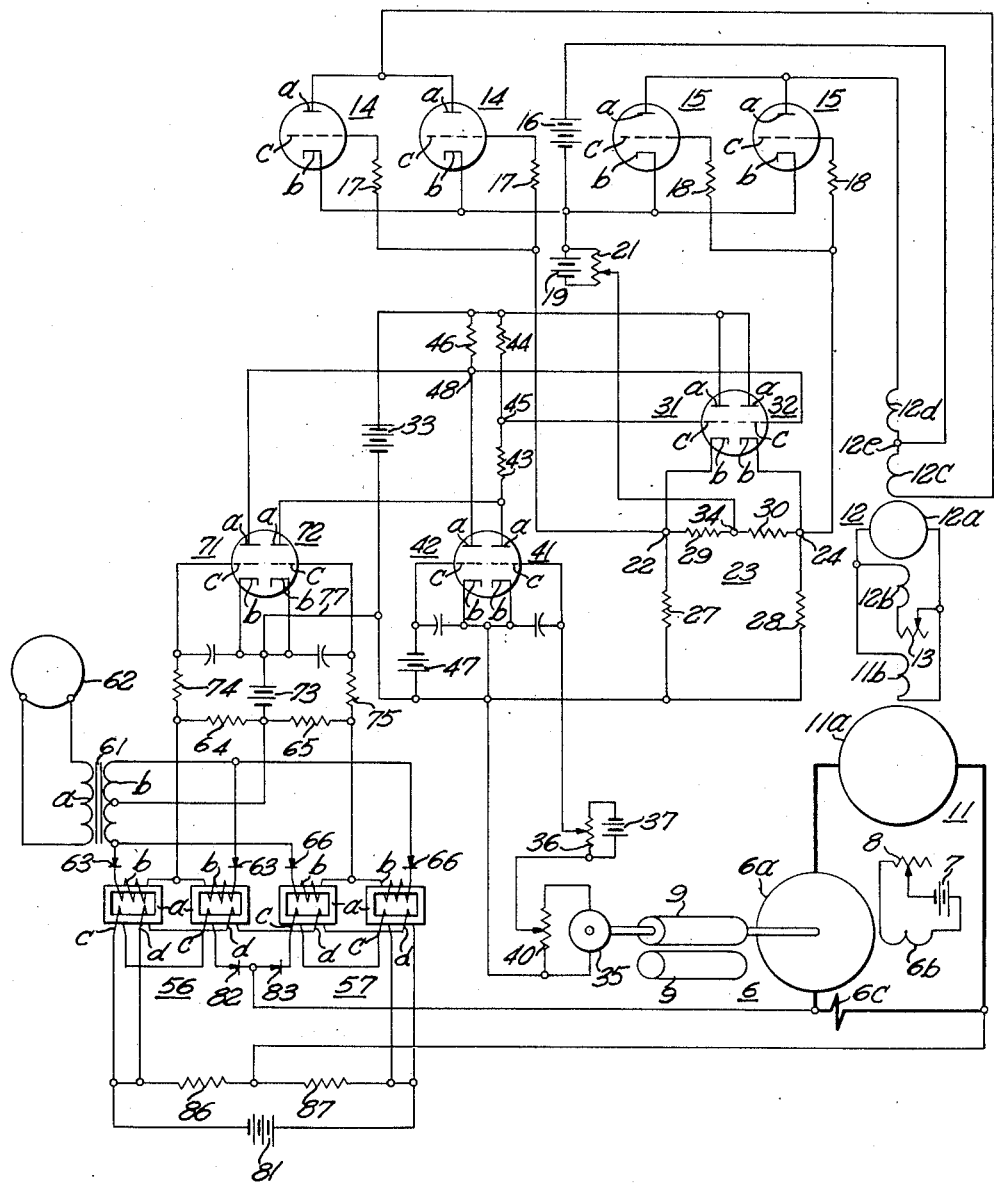
Inventor
Allan C. Halter
by Walter L. Madden Jr.
Attorney Patented Nov. 10, 1953

2,659,040

UNITED STATES PATENT OFFICE 2,659,040

ELECTRIC CONTROL SYSTEM FOR DYNAMOELECTRIC MACHINES WITH REVERSIBLE CURRENT

Allan C. Halter, Milwaukee, Wis., assignor to Allis-Chalmers Manufacturing Company, Milwaukee, Wis.

Application June 1, 1951, Serial No. 229,299

4 Claims. (Cl. 318—142)

This invention relates in general to improvements in electric control systems and in particular to means for controlling a dynamoelectric machine to limit the magnitude of an operating condition thereof.

It is an object of the present invention to provide an improved control system for a dynamoelectric machine provided with regulating means for maintaining one operating condition of the machine constant in which system the operation of the regulating means is abruptly overcome in response to another operating condition of the machine attaining a critical limiting value.

It is a further object of the present invention to provide an improved control system for a dynamoelectric machine provided with regulating means for maintaining one operating condition of the machine constant, in which system the protective means is operative independently of the regulating means.

Objects and advantages other than those set forth above will be readily apparent from the following description when read in connection with the accompanying drawing, the single figure of which diagrammatically illustrates the circuits and apparatus of the invention.

Referring more particularly to the drawing by character of reference, numeral 6 designates a dynamoelectric machine of which an operating condition is to be regulated. Machine 6 is provided with an armature 6a and a field winding 6b energized from any suitable source such as a battery 7 through an adjustable resistor 8. Machine 6 may be a motor of any suitable type, such as a direct current motor driving any suitable load device such as the rolls 9 of one section of a paper mill. Machine 6 is energized from the armature 11a of a generator 11 having a field winding 11b. Field winding 11b is energized from the armature 12a of an exciter generator 12 having a self energizing field winding 12b and a pair of differentially acting field windings 12c, 12d. Field winding 12b is connected across armature 12a in series with an adjustable resistor 13.

Field windings 12c, 12d are energized from suitable control means such as first electric valve means comprising a pair of triodes 14 and second electric valve means comprising a similar pair of triodes 15. Triodes 14 are each provided with an anode 14a, a cathode 14b, and a control grid 14c. Each triode 15 is similarly provided with an anode 15a, a cathode 15b and a control grid 15c. Anodes 14a are connected in parallel with each other to one terminal of field winding 12c, and anodes 15a are similarly connected in parallel with each other to a terminal of field winding 12d. Cathodes 14b, 15b are connected together to the negative terminal of a suitable source of plate voltage for triodes 14, 15, such as a battery 16. The positive terminal of battery 16 is connected to a common terminal 12e of field windings 12c, 12d to supply to field windings 12c, 12d currents determined by the conductivities of triodes 14, 15.

Each grid 14c has connected in series therewith a current limiting resistor 17 and grids 15c are provided with similar resistors 18. Grids 14c are connected to an output terminal 22 of a cathode follower bridge circuit 23, and grids 15c are similarly connected to an output terminal 24 of bridge 23. Bridge 23 comprises a pair of fixed resistors 27, 28 and a pair of variable resistance elements in the form of electric valve means such as triodes 31, 32. Triode 31 has an anode 31a, a cathode 31b and a control grid 31c, and triode 32 has an anode 32a, a cathode 32b and a control grid 32c. If desired, triodes 31, 32 may be mounted within a common envelope as shown in the drawing. Anodes 31a, 32a are connected to the positive terminal of a plate voltage battery 33, and cathodes 31b, 32b are connected through resistors 27, 28 respectively, to the negative terminal of battery 33. A pair of resistors 29, 30 are serially connected between terminals 22, 24 and a neutral terminal 34 is provided intermediate resistors 29, 30. This intermediate terminal is connected to cathodes 14b, 15b through a biasing battery 19 and a voltage divider 21 to cause the conductivity of triodes 14, 15 to vary in response to variations in the voltage between terminals 22, 24.

The potential difference between terminals 22, 24 may be varied in response to variations in the operating condition being controlled. If it is desired to control the speed of machine 6, a tachometer generator 35 may be connected to machine 6 to produce a voltage proportional to the speed of the machine. The voltage of tachometer generator 35 is impressed across a speed setting voltage divider 40 and an adjustable portion thereof is compared with the voltage of a suitable reference, such as the voltage impressed across a voltage divider 36 by a battery 37, and the resulting voltage difference is impressed between the cathode 41b and the grid 41c of a triode 41 having an anode 41a. Anode 41a is connected through resistors 43, 44 to the positive terminal of battery 33, and grid 31c of triode 31 is connected to a common terminal 45 between resistors 43, 44. A triode 42 similar to triode 41 may be mounted in a common envelope with triode 41 and the anode 42a thereof connected to battery 33 through a resistor 46. Grid 32c is connected to a terminal 48 between resistor 46 and anode 42a. Suitable biasing means, such as a battery 47, may be connected between cathode 42b and grid 42c to maintain triode 42 in a predetermined state of conductivity.

To prevent an operating condition of machine 6 other than the condition being regulated from substantially exceeding a limiting value, limiting means including a pair of saturable reactors 56, 57 are associated with the regulating system. Reactor 56 comprises a pair of saturable cores 56a, a reactance winding 56b divided into two portions severally wound on the two cores, a control winding 56c likewise divided into two portions and a bias winding 56d similarly comprising two portions. Reactor 57 similarly comprises a pair of saturable cores 57a, a reactance winding 57b, a control winding 57c and a bias winding 57d. Reactance windings 56b, 57b are energized in parallel with each other from a suitable source of alternating current, such as the secondary winding 61b of a transformer 61 having a primary winding 61a connected to an alternating current generator 62. Connected in circuit with reactance winding 56b and secondary winding 61b through rectifiers 63 in a resistor 64 which has impressed thereacross a unidirectional signal voltage having a magnitude dependent upon the saturation of reactor 56. A second resistor 65 is similarly connected with reactance winding 57b and winding 61b through rectifiers 66 to produce across resistor 65 a unidirectional signal voltage having a magnitude dependent upon the saturation of reactor 57.

Resistor 64 is connected in the grid circuit of electric valve means comprising a triode 71 having an anode 71a, a cathode 71b and a control grid 71c. Resistor 65 is similarly connected in the grid circuit of a triode 72 having an anode 72a, a cathode 72b, and a control grid 72c. Resistor 64 is connected between cathode 71b and grid 71c in series with a biasing battery 73 and a resistor 74, while resistor 65 is connected between cathode 72b and grid 72c in series with battery 73 and a resistor 75. Anode 71a is connected to terminal 48, and anode 72a is connected to anode 41a. Cathodes 71b, 72b are connected together to the negative terminal of battery 33 through a conductor 77.

Bias windings 56d, 57d are serially connected with each other across a suitable source of substantially constant bias voltage, such as a battery 81. Control windings 56c, 57c are serially connected with each other and a pair of half wave rectifiers 82, 83 across battery 81. Rectifiers 82, 83 are poled so as to prevent the flow of current from battery 81 through windings 56c, 57c. A pair of resistors 86, 87 are serially connected with each other across battery 81 and a voltage which is a measure of the condition to be limited is impressed between the common terminal of rectifiers 82, 83 and the common terminal of resistors 86, 87. If it is desired to prevent the current in machine 6 from substantially exceeding a predetermined maximum value, an interpole winding 6c of machine 6 may be connected as shown to impress between the common terminals of rectifiers 82, 83, and resistors 86, 87 a voltage which is a measure of the current in machine 6.

In operation, with machines 11 and 12 running, machine 6 operates at a speed dependent upon the voltage of armature 11a resulting from the excitation of field winding 11b, which excitation is in turn determined by the voltage of armature 12a. Assuming that machine 6 is operating at the desired speed, the voltage impressed by tachometer generator 35 on divider 40 is less than the voltage of voltage divider 36 by a predetermined amount, and this voltage difference is impressed between grid 41c and cathode 41b to maintain triode 41 in a predetermined state of conductivity. This predetermined conductivity is selected with respect to the conductivity of triode 42, as determined by bias battery 47, so that terminals 45, 48 are at the same potential when the speed of machine 6 has the desired value.

With terminals 45, 48 at the same potential, grids 31c, 32c are also at equal potentials, resulting in equal conductivities of triodes 31, 32. Assuming that resistors 27, 28 have equal values of resistance, terminals 22, 24 are thus at the same potential and no voltage is impressed upon grids 14c, 15c by bridge 23. The conductivities of triodes 14, 15 are therefore determined by the bias voltage across voltage divider 21, and assuming that resistor 13 is adjusted so that self exciting field winding 12b supplies all of the excitation required to maintain the voltage of armature 12a at any given value, divider 21 may be adjusted so that triodes 14, 15 are rendered partially conductive to a preselected extent. Under these conditions, equal currents are supplied to differentially acting field windings 12c, 12d and field winding 12b maintains the voltage of armature 12a at the value required to maintain the speed of machine 6 at the desired value.

During the above described operation of the system, interpole winding 6c impresses between the common terminal of rectifiers 82, 83 and the common terminal of resistors 86, 87 a voltage proportional to the current in machine 6. This voltage, when generator 11 is supplying current to machine 6, acts cumulatively on winding 56c with respect to the voltage of resistor 86 and acts differentially with respect to the voltage of resistor 87 on winding 57c. Rectifier 82 prevents the flow of current through winding 56c under these conditions and rectifier 83 permits current to flow through winding 57c only when the voltage across winding 6c extends the voltage of resistor 87. Therefore, during the above described operation, if the current in machine 6 remains below the maximum value, the voltage of winding 6c is less than the voltage of resistor 87 and no current flows through windings 56c, 57c.

The bias current supplied by battery 81 to bias windings 56d, 57d produces in windings 56d, 57d magnetomotive forces which cancel the magnetomotive forces of reactance windings 56b, 57b, respectively, when no current is flowing in control windings 56c, 57c, so that substantially no current flows through reactance windings 56b, 57b under these conditions. With substantially no current flowing through windings 56b, 57b, the voltage drops across resistors 64, 65 are negligible, so that battery 73 maintains triodes 71, 72 nonconductive and without effect on the regulating system.

If the speed of machine 6 increases above the desired value, the voltage impressed across divider 40 by tachometer generator 35 increases to render grid 41c less negative and thereby increase the conductivity of triode 41. An increase in conductivity of triode 41 decreases the potential of terminal 45 and the potential of grid 31c to decrease the potential of terminal 22 with respect to the potential of terminal 24. Grids 15c are thereby rendered more positive with respect to their cathodes 15b to render triodes 15 more conductive and grids 14c are rendered less positive to render triodes 14 less conductive. This action increases the energization of winding 12d with respect to winding 12c to reduce the voltage of armature 12a for returning the speed of machine 6 to the desired value. The same action occurs if the desired speed setting is lowered by moving the adjustable tap divider 40.

A sequence of operations converse to that described above occurs when the speed of machine 6 decreases below the desired value or when the speed setting is raised by moving the adjustable tap of divider 40.

If, during acceleration of machine 6, the machine armature current tends to exceed the limiting value, the voltage across interpole winding 6c increases above the voltage of resistor 87 and rectifier 83 thereupon permits current to flow through control winding 57c. This current in control winding 57c produces a magnetomotive force which opposes the magnetomotive force of winding 57d and aids the magnetomotive force of winding 57b to lower the reactance of reactance winding 57b to permit a substantial current to flow through winding 57b and resistor 65. The saturating action of control winding 57c is strengthened by the self-saturating action of rectifiers 66, so that a small current in control winding 57c causes a substantial current to flow in reactance winding 57b and resistor 65. This current in resistor 65 produces a voltage thereacross which renders triode 72 abruptly conductive so that the potential of anode 41a, to which anode 72a is connected, and the potential of terminal 45, are abruptly lowered. A decrease in the potential of terminal 45 lowers the potential of grid 31c to unbalance bridge 23 and render terminal 24 positive with respect to terminal 22. Triodes 15 are thereupon rendered more conductive to supply to field winding 12d additional current to prevent the current in machine 6 from substantially exceeding the limiting value.

When the speed setting of divider 40 is rapidly changed to reduce the speed of machine 6 or when it is desired to regeneratively brake machine 6 to a stop, the high inertia of rolls 9 and the associated equipment causes the voltage of machine 6 to exceed the voltage of machine 11, causing machine 6 to act as a generator supplying machine 11 as a motor, thereby reversing the direction of current flow in armature 6a. This reversal of current renders the voltage of interpole winding 6c cumulative with respect to the voltage of resistor 87 and differential with respect to the voltage of resistor 86, so that if this reversed current tends to exceed the maximum value, rectifier 82 permits current to flow through control winding 56c, while rectifier 83 blocks the flow of current through control winding 57c. A substantial current thereupon flows through reactance winding 56b and resistor 64 to render triode 71 abruptly conductive. This action abruptly lowers the potential of terminal 48 and grid 32c to decrease the conductivity of triode 32 and thereby unbalance bridge 23 to render triodes 14 conductive. Triodes 14 thereupon supply more current to field winding 12c to increase the voltage of armature 11a and thereby prevent the current in machine 6 from substantially exceeding the maximum value.

If resistor 43 was not utilized and grid 31c was consequently connected directly to anode 41a, the above described decrease in the potential of terminal 48 and grid 32c might not produce the desired unbalance of bridge 23, since, if triode 41 was fully conductive, the potential of grid 31c would be at its lowest value and even if triode 71 was fully conductive, the potential of terminal 48 and grid 32c could not decrease below the potential of grid 31c to unbalance bridge 23 to produce the desired current limiting action.

However, with resistor 43 connected as shown and with triode 71 fully conductive as described above, the voltage drop across resistor 43 causes the potential of terminal 48 to be lower than the potential of terminal 45 independently of the state of conductivity of triode 41, so that bridge 23 is unbalanced to produce the desired current limiting action.

Although but one embodiment of the present invention has been illustrated and described, it will be apparent to those skilled in the art that various changes and modifications may be made therein without departing from the spirit of the invention or the scope of the appended claims. Features disclosed but not claimed herein are claimed in application of Thomas H. Bloodworth, Serial Number 229,329, filed June 1, 1951, now Patent No. 2,632,139.

It is claimed and desired to secure by Letters Patent:

1. In a system for maintaining an operating condition of a dynamoelectric machine substantially constant at a predetermined value, the combination of a first source for supplying current to said machine, means for reversing the direction of current flow in said machine, first electric valve means having a first anode, a first cathode and a first control grid, second electric valve means having a second anode, a second cathode and a second control grid, a source of unidirectional energizing voltage, means connecting the second said source to said first and said second valve means including a connection of negligible impedance between the second said source and said cathodes, a first resistor connected in series with said first anode and said source of unidirectional voltage, a second resistor and a third resistor serially connected with each other between said second anode and said source of unidirectional voltage, a first terminal between said first resistor and said first anode, a second terminal between said second and said third resistors, control means connected to said first and said second terminals to be energized in dependence upon the polarity and magnitude of the potential difference between said first and said second terminals for controlling the flow of current from said first source to said machine, means connected to said machine and to said second grid for varying the potential of said second terminal in response to variations in said operating condition from said predetermined value while maintaining the potential of said first terminal at a constant value, and limiting means connected to said machine and to said first and second valve means for abruptly decreasing the potential of one of said terminals when said machine current reaches a predetermined maximum value, the potential of said first terminal being abruptly decreased when said current reaches said maximum value of one polarity and the potential of said second terminal being abruptly decreased when said current reaches said maximum value of the other polarity, whereby when the potential of said first terminal is decreased by said limiting means the voltage drop across said third resistor causes the potential of said first terminal to be lower than the potential of said second terminal independently of the state of conductivity of said second valve means.

2. In a system for maintaining an operating condition of a dynamoelectric machine substantially constant at a predetermined value, the combination of a first source for supplying current to said machine, means for reversing the direction of current flow in said machine, first electric valve means and second electric valve means for controlling the flow of said current to said machine, said first valve means having a first control grid and said second valve means having a second control grid, third electric valve means having a third anode, a third cathode and a third control grid, fourth electric valve means having a fourth anode, a fourth cathode and a fourth control grid, a second source of unidirectional energizing voltage, means connecting said second source to said third and fourth valve means including a connection of negligible impedance between said second source and said third and fourth cathodes, a first resistor connecting said third anode to said second source, a second resistor and a third resistor serially connected with each other between said fourth anode and said second source, means connecting said first grid to a first terminal between said first resistor and said third anode to vary the conductivity of said first valve means in dependence upon the potential of said first terminal, means connecting said second grid to a second terminal between said second and said third resistors to vary the conductivity of said second valve means in dependence upon the potential of said second terminal, means connected to said machine and to said fourth grid for varying the potential of said second terminal in response to variations in said operating condition from said predetermined value while maintaining the potential of said first terminal at a constant value to vary the current supplied to said machine from said first source, and limiting means connected to said machine and to said third and fourth anodes for abruptly decreasing the potential of one of said terminals when said machine current reaches a predetermined maximum value, the potential of said first terminal being abruptly decreased when said current reaches a predetermined maximum value of one polarity and the potential of said second terminal being abruptly decreased when said current reaches a predetermined maximum value of the other polarity, whereby when the potential of said first terminal is decreased by said limiting means the voltage drop across said third resistor causes the potential of said first terminal to be lower than the potential of said second terminal independently of the state of conductivity of said fourth triode.

3. In a system for maintaining an operating condition of a dynamoelectric machine substantially constant at a predetermined value, the combination of a first source for supplying current to said machine, means for reversing the direction of current flow in said machine, a pair of differentially acting field windings for controlling the flow of said current to said machine, first electric valve means for controlling the energization of one of said field windings, said first valve means having a first control grid, second electric valve means for controlling the energization of the other of said field windings, said second valve means having a second control grid, third electric valve means having a third anode, a third cathode and a third control grid, fourth electric valve means having a fourth anode, a fourth cathode and a fourth control grid, a second source of energizing voltage, means connecting said second source to said third and fourth valve means including a connection of negligible impedance between said second source and said third and fourth cathodes, a first resistor connecting said third anode to said second source, a second resistor and a third resistor serially connected with each other between said fourth anode and said second source, means connecting said first grid to a first terminal between said first resistor and said third anode to vary the conductivity of said first valve means in dependence upon the potential of said first terminal, means connecting said second grid to a second terminal between said second and said third resistors to vary the conductivity of said second valve means in dependence upon a potential of said second terminal, means connected to said machine and to said fourth grid for varying the potential of said second terminal in response to variations in said operating condition from said predetermined value while maintaining the potential of said first terminal at a constant value to vary the energization of said field windings to maintain said operating condition substantially constant at said predetermined value, and limiting means connected to said machine and to said third and fourth anodes for abruptly decreasing the potential of one of said terminals when said machine current reaches a predetermined maximum value, the potential of said first terminal being abruptly decreased when said current reaches a predetermined maximum value of one polarity and the potential of said second terminal being abruptly decreased when said current reaches a predetermined maximum value of the other polarity, whereby when the potential of said first terminal is decreased by said limiting means the voltage drop across said third resistor causes the potential of said first terminal to be lower than the potential of said second terminal independently of the state of conductivity of said fourth valve means.

4. In a system for maintaining an operating condition of a dynamoelectric machine substantially constant at a predetermined value, the combination of a first source for supplying current to said machine, means for reversing the direction of current flow in said machine, first electric valve means and second electric valve means for controlling the flow of said current to said machine, said first valve means having a first control grid and said second valve means having a second control grid, third electric valve means having a third anode, a third cathode and a third control grid, fourth electric valve means having a fourth anode, a fourth cathode and a fourth control grid, a second source of voltage, a first resistor connecting said third cathode to said second source, a second resistor connecting said fourth cathode to said second source, a first terminal between said third cathode and said first resistor, a second terminal between said fourth cathode and said second resistor, a third resistor and a fourth resistor serially connected with each other between said first and second terminals, means connecting said first grid to said first terminal, means connecting said second grid to said second terminal, fifth electric valve means having a fifth anode, a fifth cathode and a fifth control grid, sixth electric valve means having a sixth anode, a sixth cathode and a sixth control grid, means connecting said fifth and said sixth valve means to said second source including a connection of negligible impedance between said second source and said fifth and sixth cathodes, a fifth resistor connecting said fifth anode to said second source, a sixth resistor and a seventh resistor serially connected with each other between said sixth anode and said second source, means connecting said third grid to a third terminal between said fifth resistor and said fifth anode to vary the conductivity of said first valve means in dependence upon the potential of said third terminal, means connecting said fourth grid to a fourth terminal between said sixth and said seventh resistors to vary the conductivity of said second valve means in dependence upon the potential of said fourth terminal, means connected to said machine and to said sixth grid for varying the potential of said fourth terminal in response to variations in said operating condition from said predetermined value while maintaining the potential of said third terminal at a constant value to vary the current supplied to said machine, and limiting means connected to said machine and to said fifth and sixth anodes for abruptly decreasing the potential of said third or said fourth terminal when said machine current reaches a predetermined maximum value, the potential of said third terminal being abruptly decreased when said current reaches a predetermined maximum value of one polarity and the potential of said fourth terminal being abruptly decreased when said current reaches a predetermined maximum value of the other polarity, whereby when the potential of said third terminal is decreased by said limiting means the voltage drop across said seventh resistor causes the potential of said third terminal to be lower than the potential of said fourth terminal independently of the state of conductivity of said sixth valve means.

ALLAN C. HALTER.

References Cited in the file of this patent

UNITED STATES PATENTS

| Number | Name | Date |
|---|---|---|
| 2,550,122 | Osbon | Apr. 24, 1951 |